United States Patent
Duan et al.

(10) Patent No.: US 9,959,326 B2
(45) Date of Patent: May 1, 2018

(54) ANNOTATING SCHEMA ELEMENTS BASED ON ASSOCIATING DATA INSTANCES WITH KNOWLEDGE BASE ENTITIES

(75) Inventors: Songyun Duan, Pleasantville, NY (US); Achille B. Fokoue-Nkoutche, White Plains, NY (US); Oktie Hassanzadeh, Toronto (CA); Anastasios Kementsietsidis, New York, NY (US); Kavitha Srinivas, Rye, NY (US); Michael J. Ward, New Haven, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 261 days.

(21) Appl. No.: 13/070,238

(22) Filed: Mar. 23, 2011

(65) Prior Publication Data
US 2012/0246175 A1    Sep. 27, 2012

(51) Int. Cl.
*G06F 17/30*    (2006.01)

(52) U.S. Cl.
CPC .. *G06F 17/30545* (2013.01); *G06F 17/30566* (2013.01)

(58) Field of Classification Search
CPC .................... G06F 17/30545; G06F 17/30566
USPC ........................................ 707/736, 790, 803
See application file for complete search history.

(56) References Cited

U.S. PATENT DOCUMENTS

| | | | |
|---|---|---|---|
| 5,832,475 A | 11/1998 | Agrawal et al. | |
| 5,893,059 A * | 4/1999 | Raman ................. | G10L 15/063 704/236 |
| 7,668,885 B2 | 2/2010 | Wittke et al. | |
| 7,676,739 B2 | 3/2010 | Lang et al. | |
| 7,809,723 B2 * | 10/2010 | Liu et al. ....................... | 707/736 |
| 7,861,154 B2 | 12/2010 | MacLaurin | |
| 8,090,724 B1 * | 1/2012 | Welch et al. .................. | 707/750 |
| 2002/0099696 A1 | 7/2002 | Prince | |
| 2002/0099737 A1 | 7/2002 | Porter et al. | |
| 2004/0054661 A1 | 3/2004 | Cheung et al. | |
| 2004/0243557 A1 * | 12/2004 | Broder ................ | G06F 17/2785 |
| 2004/0260702 A1 * | 12/2004 | Cragun et al. ................ | 707/100 |
| 2004/0267700 A1 | 12/2004 | Dumais et al. | |
| 2005/0114328 A1 | 5/2005 | Riccardi et al. | |
| 2005/0149496 A1 * | 7/2005 | Mukherjee ........ | G06F 17/30528 |
| 2005/0154708 A1 | 7/2005 | Sun | |
| 2006/0253428 A1 | 11/2006 | Katariya et al. | |
| 2007/0043702 A1 | 2/2007 | Lakshminarayanan et al. | |

(Continued)

OTHER PUBLICATIONS

Microsoft Computer Dictionary, Fifth Edition, Copyright 2002 by Microsoft Corporation.*

(Continued)

*Primary Examiner* — Shiow-Jy Fan
(74) *Attorney, Agent, or Firm* — Tutunjian & Bitetto, P.C.; Rabin Bhattacharya

(57) ABSTRACT

Methods and systems for determining schema element types are shown that include pooling potential annotations for an element of an unlabeled schema from a plurality of heterogeneous sources, scoring the pool of potential annotations according to relevancy using information using instance information from the plurality of heterogeneous sources to produce a relevancy score, and annotating the element of the unlabeled schema using the most relevant potential annotations.

21 Claims, 3 Drawing Sheets

(56) References Cited

U.S. PATENT DOCUMENTS

| | | | |
|---|---|---|---|
| 2007/0055655 | A1 | 3/2007 | Bernstein et al. |
| 2007/0061335 | A1 | 3/2007 | Ramer et al. |
| 2007/0250486 | A1* | 10/2007 | Liao et al. .................. 707/3 |
| 2007/0282824 | A1 | 12/2007 | Ellingsworth |
| 2008/0005076 | A1* | 1/2008 | Payne ............... G06F 17/30964 |
| 2008/0065655 | A1 | 3/2008 | Chakravarthy et al. |
| 2008/0071742 | A1 | 3/2008 | Yang et al. |
| 2008/0147718 | A1 | 6/2008 | Dettinger et al. |
| 2008/0208855 | A1 | 8/2008 | Lingenfelder et al. |
| 2008/0301168 | A1 | 12/2008 | Adler et al. |
| 2008/0313162 | A1 | 12/2008 | Bahrami et al. |
| 2009/0037804 | A1 | 2/2009 | Theobald |
| 2009/0234799 | A1 | 9/2009 | Betawadkar-Norwood et al. |
| 2009/0327241 | A1 | 12/2009 | Douillet et al. |
| 2009/0327870 | A1 | 12/2009 | Bar-Or et al. |
| 2009/0327972 | A1 | 12/2009 | McCann et al. |
| 2010/0063971 | A1 | 3/2010 | Cragun et al. |
| 2010/0115393 | A1 | 5/2010 | Albornoz et al. |
| 2010/0153318 | A1 | 6/2010 | Branavan et al. |
| 2010/0185700 | A1* | 7/2010 | Bodain .................. 707/803 |
| 2010/0198831 | A1 | 8/2010 | Feng et al. |
| 2010/0250304 | A1 | 9/2010 | Whitaker et al. |
| 2010/0274783 | A1* | 10/2010 | Chevalier ........... G06F 17/3053 707/723 |
| 2010/0281023 | A1* | 11/2010 | Chevalier ........... G06F 17/3053 707/723 |
| 2010/0306141 | A1 | 12/2010 | Chidlovskii |
| 2011/0106823 | A1* | 5/2011 | Urbschat et al. ............. 707/754 |
| 2011/0153666 | A1 | 6/2011 | Flynn et al. |
| 2011/0289026 | A1* | 11/2011 | Kannan et al. ................. 706/12 |
| 2011/0307483 | A1 | 12/2011 | Radlinski et al. |

OTHER PUBLICATIONS

Patent Cooperation Treaty. "International Search Report and Written Opinion of the International Searching Authority" Issued for International Application No. PCT/US2012/029612. dated Jun. 2012. (9 pages).

Ben-Yitzhak, O., et al., "Beyond Basic Faceted Search", ACM International Conference on Web Search and Data Mining, Feb. 2008, pp. 33-43.

Bergamaschi, S. et al., "Intelligent Techniques for the Extraction and Integration of Heterogeneous Information", Proceedings of the IJCAI-99 Workshop on Intelligent Information Integration, Jul. 1999, 14 pages.

Chen, S. et al., "Database-Centric Programming for Wide-Area Sensor Systems", Proceedings of the International Conference on Distributed Computing in Sensor Systems, Jun. 2005, 18 pages.

Embley, D.W. et al., "Automatic Creation and Simplified Querying of Semantic Web Content", Proceedings of the first Asian Semantic Web Conference, Sep. 2006, 15 pages.

Hu, X. et al., "A Novel Region-Based Image Annotation Using Multi-Instance Learning", Second International Workshop on Knowledge Discovery and Data Mining, Jan. 2009, pp. 602-605.

Karamitopoulos, L. et al., "Cluster-Based Similarity Search in Time Series", 2009 Fourth Balkan Conference in Informatics, Sep. 2009, pp. 113-118.

Kwon, Y.M. et al., "A Separated Indexing Technique for Efficient Evaluation of Nested Queries", Journal of the Institute of Electronics Engineers of Korea, vol. 29, No. 7, 1992, pp. 11-22.

Nummiaho, A. et al., "Utilizing Existing Semantic Knowledge Bases for Creating Annotations on Mobile Devices", Proceedings of the 2009 Tenth International Conference on Mobile Data Management: Systems, Services and Middleware, May 2009, pp. 554-559.

Petridis, K. et al., "Knowledge Representation and Semantic Annotation of Multimedia Content", Vision, Image and Signal Processing, IEE Proceedings, vol. 153, Issue 3, Jun. 2006, pp. 255-262.

Toyama, T. et al., "KnownStyleNoLife.com: Resource Sharing System for Explicit Fashion-Related Image Annotation", 2008 IEEE/WIC/ACM International Conference on Web Intelligence and Intelligent Agent Technology, Dec. 2008, pp. 152-156.

International Search Report and Written Opinion issued for International Application No. PCT/US2012/029607 dated May 31, 2012 (12 pages).

Office Action for U.S. Appl. No. 13/070,193 dated Jun. 20, 2012 (20 pages).

Office Action for U.S. Appl. No. 13/070,193 dated Jul. 15, 2016 (26 pages).

Office Action for U.S. Appl. No. 13/070,193 dated Nov. 25, 2016 (34 pages).

Office Action for U.S. Appl. No. 13/070,193 dated May 23, 2017 (46 pages).

* cited by examiner

ANNOTATING SCHEMA ELEMENTS BASED ON ASSOCIATING DATA INSTANCES WITH KNOWLEDGE BASE ENTITIES

RELATED APPLICATION INFORMATION

This application is further related to application Ser. No. 13/070,193, filed Mar. 23, 2011, incorporated herein by reference.

BACKGROUND

Technical Field

The present invention relates to data annotation and, in particular, to systems and methods for annotating data elements based on heterogeneous knowledge bases.

Description of the Related Art

Every day, businesses accumulate massive amounts of data from a variety of sources and employ an increasing number of heterogeneous, distributed, and often legacy data repositories to store them. Existing data analytics solutions are not capable of addressing the explosion of data, such that business insights not only remain hidden in the data, but are increasingly difficult to find.

Keyword search is the most popular way of finding information on the Internet. However, keyword search is not compelling in business contexts. Consider, for example, a business analyst of a technology company, interested in analyzing the company's records for customers in the healthcare industry. Given keyword search functionality, the analyst might issue a "healthcare customers" query over a large number of repositories. Although the search will return results that use the word "healthcare" or some derivative thereof, the search would not return, for example, Entity A even though Entity A is a company in the healthcare industry. Even worse, the search will return many results having no apparent connection between them. In this case, it would fail to provide a connection between Entity A and Subsidiary B, even though the former acquired the latter.

Although many repositories are available, the techniques for correlating those heterogeneous sources have been inadequate to the task of linking information across repositories in a fashion that is both precise with respect to the users' intent and scalable. Extant techniques perform entity matching in a batch, offline fashion. Such methods generate every possible link, between all possible linkable entities. Generating thousands of links not only requires substantial computation time and considerable storage space, but also requires substantial effort, as the links must be verified and cleaned, due to the highly imprecise nature of linking methods.

SUMMARY

A method for determining schema element types is shown that includes pooling potential annotations for an element of an unlabeled schema from a plurality of heterogeneous sources, scoring with a processor the pool of potential annotations according to relevancy using information using instance information from the plurality of heterogeneous sources to produce a relevancy score, and annotating the element of the unlabeled schema using the most relevant potential annotations.

A system for determining schema element types is shown that includes a query module configured to pool potential annotations for an element of an unlabeled schema from a plurality of heterogeneous sources, a data module config-ured to score the pool of potential annotations using a processor according to relevancy using information using instance information from the plurality of heterogeneous sources to produce a relevancy score, and a data linker configured to annotate the element of the unlabeled schema using the most relevant potential annotations.

A method for determining schema element types is shown that includes pooling potential annotations in a hierarchical structure for an element of an unlabeled schema from a plurality of heterogeneous sources, wherein the hierarchical structures from the plurality of sources are combined into a single hierarchy to correlate all of the potential annotations for the element, scoring with a processor the pool of potential annotations according to structural properties of the potential annotations, such that potential annotations that are further away in a structure from a potential annotation that is being scored are assigned smaller scores than types that are closer in the structure to the potential annotation being scored, to produce a relevancy score, and annotating the element of the unlabeled schema using the most relevant potential annotations.

A system for determining schema element types is shown that includes a query module configured pool potential annotations in a hierarchical structure for an element of an unlabeled schema from a plurality of heterogeneous sources, wherein the hierarchical structures from the plurality of sources are combined into a single hierarchy to correlate all of the potential annotations for the element, a data module configured to score the pool of potential annotations using a processor according to structural properties of the potential annotations, such that potential annotations that are further away in a structure from a potential annotation that is being scored are assigned smaller scores than types that are closer in the structure to the potential annotation being scored, to produce a relevancy score, and a data linker configured to annotate the element of the unlabeled schema using the most relevant potential annotations.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The usefulness of individual pieces of data is greatly increased when those data are placed into their proper context and interrelated. As data sets increase in size and complexity, and as the number of repositories multiplies, the burden of providing static interrelations between pieces of data becomes unmanageable. However, the problem may be made tractable by applying a dynamic and context-dependent linking mechanism according to the present principles. User profile metadata, in conjunction with metadata associated with input keywords, is used to link dynamically—in other words, only checking entities which reside in different repositories and are potentially relevant to the current search at query time.

In addition, the present principles provide an extensible framework in which new data sources, both internal to an entity and external, can be easily incorporated to address changing business requirements. Enterprises continually produce data using informal methods like spreadsheets and business mashups. These data sources may play a significant role in evolving analytical tasks. Additionally, data that are useful to business analytics will reside in external sources, no matter how much data an enterprise manages internally. These external sources are often authorities in their fields, and trying to duplicate and independently maintain their data within an enterprise makes little sense. As such, it is useful to incorporate the results of these external sources to provide additional context for data on the fly.

Figure 1:
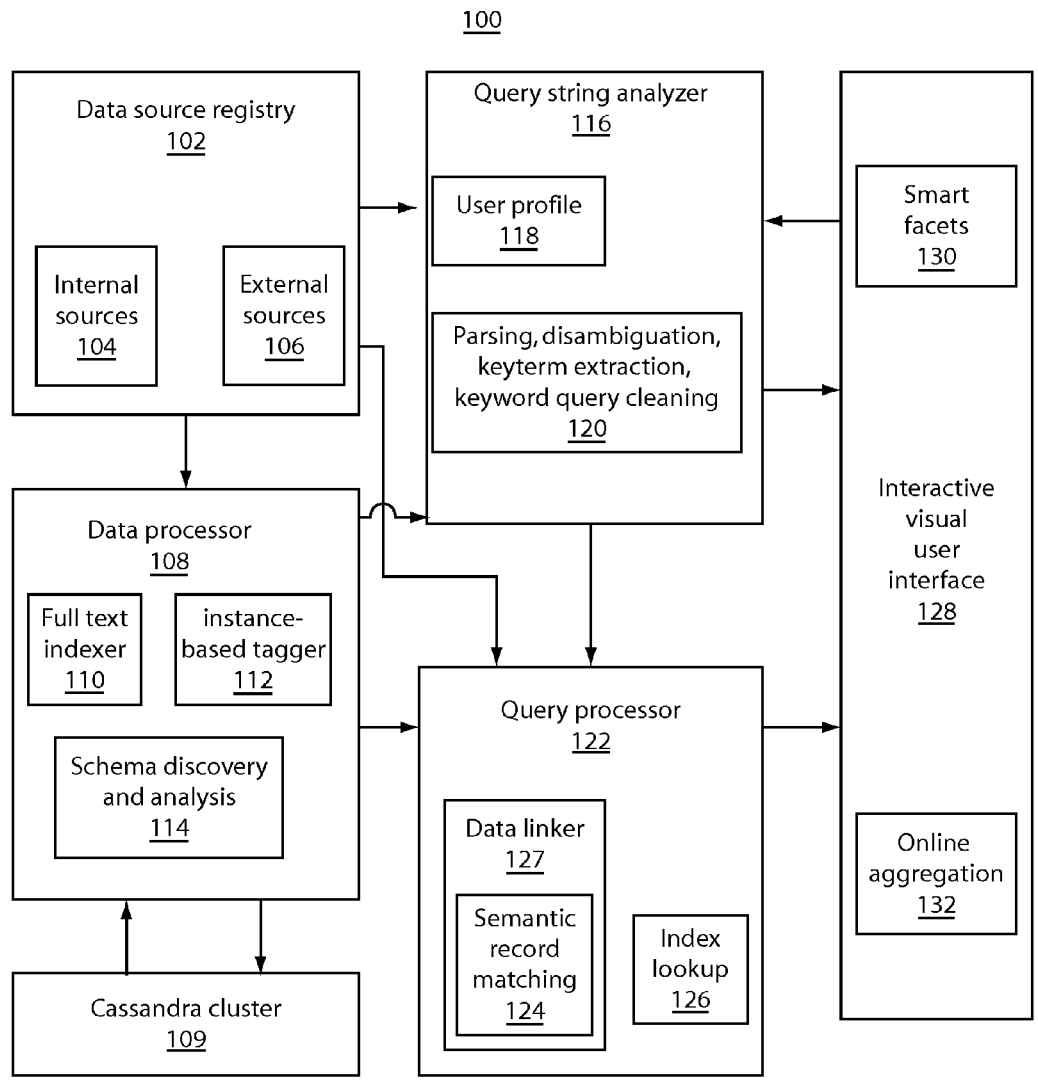
FIG. 1 is a block diagram that depicts an exemplary data analytics framework.

Referring now to FIG. 1, the architecture of a framework 100 for data analytics is shown. A data source registry 102 combines both internal sources 104 and external sources 106 and allows analysis of highly heterogeneous data. Such repositories may contain data of different formats, such as text, relational databases, and XML. The data may further have widely varying characteristics, comprising, for example, a large number of small records and a small number of large records. In addition, the data source registry 102 takes advantage of online data sources 106 with application programming interfaces (APIs) that support different query languages. The data source registry 102 keeps a catalog of available internal 104 and external 106 sources and their access methods and parameters, such as the hostname, driver module (if any), authentication information, and indexing parameters. Users can furthermore add additional sources to the data source registry as needed.

Data processor 108 provides other components in the framework 100 with a common access mechanism for the data indexed by data source registry 102. For internal sources 104, the data processor 108 provides a level of indexing and analysis that depends on the type of data source. Note that no indexing or caching is performed over external sources 106—fresh data is retrieved from the external sources 106 as needed. For internal sources 104, the first step in processing is to identify and store schema information and possibly perform data format transformation. A schema is metadata information that describes instances and elements in a dataset.

The methods described below support legacy data with no given or well-defined schema as well as semi-structured or schema-free data. Toward this end, data processor 108 performs schema discovery and analysis at block 114 for sources without an existing schema. In the case of relational data, the data processor 108 uses instance-based tagger 112 to pick a sample of instance values for each column of a table and issues them as queries to online sources to gather possible "senses" (i.e., extended data type and semantic information) of the instance values of the column. The result is a set of tags associated with each column, along with a confidence value for the tag. Following the healthcare example described above, the instance-based tagger 112 might associate "Entity A" with the type "Company," or the type "Healthcare Industry," or another type from some external source. Depending on the implementation, more than one type can be associated with each instance, and multiple types can either be represented as a set or in some hierarchical or graph structure.

Full-text indexer 110 produces an efficient full-text index across all internal repositories. This indexer may be powered by, e.g., a Cassandra (or other variety) cluster 109. Different indexing strategies may be used depending on the source characteristics. For a relational source, for example, depending on the data characteristics and value distributions, the indexing is performed over rows, where values are indexed and the primary key of their tuples are stored, or columns, where values are indexed and columns of their relations are stored. For string values, a q-gram-based index is built to allow fuzzy string matching queries. To identify indexed values, universal resource indicators are generated that uniquely identify the location of the values across all enterprise repositories. For example, indexing the string "Entity A" appearing in a column "NAME" of a tuple with a primary key CID:34234 in table "CUST," of source "SOFT_ORDERS," may result in the URI "/SOFT_ORDERS/CUST/NAME/PK=CID:34234", which uniquely identifies the source, table, tuple, and column that the value appears in.

A query analyzer 116 processes input search requests, determines the query type, and identifies key terms associated with the input query. The query interface supports several types of queries, ranging from basic keyword-based index lookup to a range of advanced search options. Users can either specify the query type within their queries or use an advanced search interface. The query analyzer 116 performs key term extraction and disambiguation at block 120. The query analyzer 116 further detects possible syntactic errors and semantic differences between a user's query and the indexed data instances and also performs segmentation.

Terms in the query string can be modifiers that specify the type or provide additional information about the following term. To permit individual customization, the query analyzer can employ a user profile 118 that includes information about a user's domain of interest in the form of a set of senses derived from external sources. The user profile 118 can be built automatically based on query history or manually by the user.

Query processor 122 relies on information it receives about a query from the query analyzer 116 to process the query and return its results. The query processor 122 issues queries to the internal index 110, via index lookup 126, as well as online APIs, and puts together and analyzes a possibly large and heterogeneous set of results retrieved from several sources. In addition to retrieving data related to the user's queries, the query processor 122 may issue more queries to online sources to gain additional information about unknown data instances. A data linking module 127 includes record matching and linking techniques that can match records with both syntactic and semantic differences. The matching is performed at block 124 between instances of attributes across the internal 104 and external 106 sources.

To increase both the efficiency and the accuracy of matchings, attribute tags (e.g., "senses") created during preprocessing are used to pick only those attributes from the sources that include data instances relevant to target attribute values. Once matching of internal and external data is performed, unsupervised clustering algorithms may be employed for grouping of related or duplicate values. The clustering takes into account evidence from matching with external data, which can be seen as performing online grouping of internal data, as opposed to offline grouping and de-duplication. This permits an enhancement of grouping quality and a decrease in the amount of preprocessing needed by avoiding offline ad-hoc grouping of all internal data values.

A user interface 128 provides a starting point for users to interact with the framework. The interface 128 may comprise, e.g., a web application or a stand-alone application. The interface 128 interacts with the query analyzer 116 to guide the user in formulating and fixing a query string. The interface also includes several advanced search features that allow the direct specification of query parameters and the manual building of a user profile 118. In most cases, more than one query type or set of key terms are identified by the query analyzer 116. The query analyzer 116 returns a ranked list of possible interpretations of the user's query string, and the user interface presents the top k interpretations along with a subset of the results. The user can then modify the query string or pick one query type and see the extended results.

The user interface 128 thereby provides online dynamic aggregation and visualization of query results via, e.g., charts and graphs. The interface 128 provides the ability for users to pick from multiple ways of aggregating results for different attributes and data types. A smart facets module 130 can dynamically determine dimensions along which data can be aggregated. The user interface 128 both provides default aggregations along these dimensions, or the interface 128 can present the list of discovered dimensions to the user and let the user pick which dimension to use. After the selection is made, query processor 122 may perform online aggregation.

As an example, consider a user who issues a query string, "healthcare in CUST_INFO," in an attempt to analyze internal data about companies in the healthcare industry. The user enters the query into user interface 128, which passes the query to query analyzer 116. The query analyzer 116 then identifies key terms as being "healthcare" and "CUST_INFO" at block 120, and furthermore detects that "healthcare" is an industry and "CUST_INFO" is a data source name in the registry 102. Therefore the analyzer 116 sends two queries to the query processor 122: an index lookup request 126 for the whole query string and a domain-specific and category-specific query (for example "industry: healthcare data-source:CUST_INFO"). For the second query, the query processor 122 issues a request to an external source 106, e.g., the Freebase API, to retrieve all objects associated with object "/en/healthcare" having type "/business/industry", which includes, among other things, all of the healthcare-related companies in Freebase. The data linking module 127 then performs efficient fuzzy record matching between the records retrieved from Freebase and internal data from external datasource 106 CUST_INFO. For effectiveness, only those internal records are retrieved whose associated schema element is tagged with a proper sense such as "/freebase/business/business_operation" that is also shared with the senses of the objects retrieved from Freebase.

Content management and data integration systems use annotations on schema attributes of managed data sources to aid in the classification, categorization, and integration of those data sources. Annotations, or tags, indicate characteristics of the particular data associated with schema attributes. Most simply, annotations may describe syntactic properties of the data, e.g., that they are dates or images encoded in a particular compression format. In more sophisticated scenarios, an annotation may indicate where the data associated with a schema element fits in, for example, a corporate taxonomy of assets. In existing systems, annotations are either provided directly by humans, by computer-aided analysis of the data along a fixed set of features, or by a combination of these two techniques. These annotation methods are labor intensive and need additional configuration and programming effort when new data sources are incorporated into a management system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
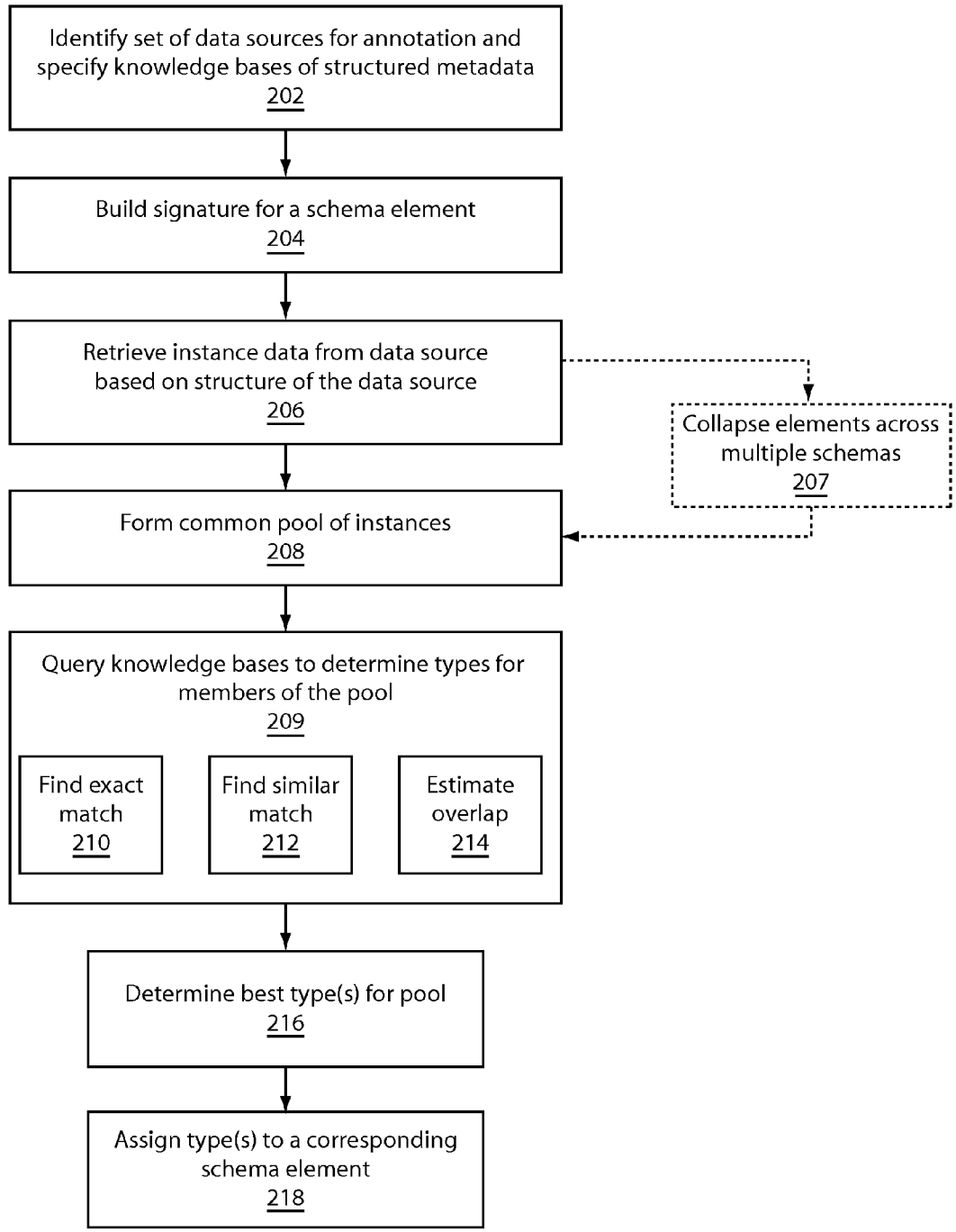
FIG. 2 is a block/flow diagram that depicts an exemplary method/system for automatically annotating schema attributes.

Referring now to FIG. 2, an exemplary method/system for automatically annotating schema attributes according to the present principles is shown. Annotation is performed by analyzing instance data using features derived from a plurality of knowledge bases. Block 202 identifies data sources I whose schema elements are to be annotated and further specifies the knowledge bases of structured metadata D to consult. Table 1 shows an exemplary data source i in I.

TABLE 1

| CUST_NAME | PROD | SHIPDATE |
|---|---|---|
| Warehouse.com | Inception | Oct. 12, 2010 |
| Streams.com | King's Speech | Dec. 24, 2010 |
| Mediahaus | Family Guy | Dec. 25, 2010 |
| Mediahaus | Cable Guy | Dec. 30, 2010 |

Block 204 builds a signature for the schema element E. In this example, an exemplary element E would be the "PROD" column. It is a component of the schema from a given source. Signatures include summary information about all of the instances for a given attribute, where an instance is one of the tuples for a particular schema element. For example, a signature might be the fact that the trigram ".com" appears often in CUST_NAME. Or, a signature can be a tokenization of the contents of an element E, such as "Mediahaus" or "Guy," because these tokens appear often in the contents (instances) of the elements. The most trivial way to build a signature is to use the actual tokens appearing in the context of the element, for example "Cable Guy" in the element PROD. Tokenization may be performed using, for example, stop-words or n-grams. Block 206 retrieves instance data for a particular schema element E from a data source i in I, based on the structure of the data source.

An optional optimization takes place at block 207. At this point, similar elements are collapsed across multiple schemas where the signatures for those elements are similar. For example, instances of the elements COMPANY and CUST_NAME might be combined if there is significant overlap in the contents of the attributes. This increases efficiency in the annotations by reducing the number of type-discoveries needed between elements in the sources I and the sources D.

Given the (potentially collapsed) schema elements, block 208 then forms a common pool of instances P from a set of instances, belonging to same or different instances, that are bundled together based on similarity. If the size of the pool P exceeds a threshold, then for optimization purposes, block 208 creates a sample S of P. The sample S may represent any subset of P up to and including P itself. For each data source d in D and for each member s in S, block 209 queries d in an attempt to discover a set of types T(s, d) of types for s in an internal 104 or external 106 source d. This discovery first attempts to find an exact match for element s in d and getting all of its types at block 210. If no exact match is found, block 212 matches the member s against a set of instance data in d that are similar or close to s and then uses their types to assign a type to s. Block 214 then estimates the overlap between instances in S and instances of type t in T(s, d). One exemplary method that may be used to estimate this overlap is the Jaccard similarity between the two sets of instances. If the overlap is significant (e.g., in excess of a threshold), then t is added to T(s, d) for every s in S.

While block 209 assumes that the types of s with respect to d can be represented as a set T(s, d), more complex representations are possible. For example, types often have inherent relationships between them. A type t might be a subtype of another type t'. As such, T(s, d) can actually be represented as a hierarchical structure, such as a tree, or even a generic graph.

Figure 3:
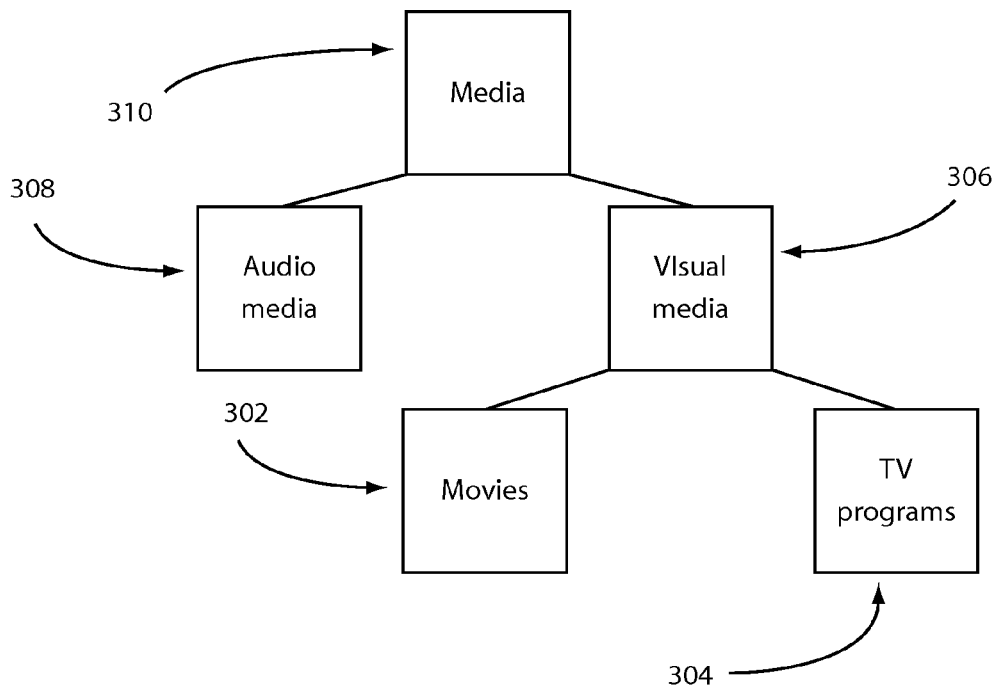
FIG. 3 is a block diagram that depicts a hierarchical annotation structure according to the present principles.

Referring now to FIG. 3, an illustrative graph of types is shown for the "PROD" element of Table 1. The type "Movies" 302 is applied to the elements "Inception," "King's Speech," and "Cable Guy." The type "TV programs" 304 is applied to the element "Family Guy." The graph of FIG. 3 shows relationships between these and other types. For example, types 302 and 304 are both related as being kinds of the type "Visual media" 306. A further supertype, "Media" 310 includes all forms of media, including "Audio media" 308. In this fashion, the types in T(s, d) can be further extended by follow-up queries in the type system of source d to also include sub-types, super-types, or related types of T(s, d).

Because each s can have a different set of types T(s, d) with respect to d, block 216 determines what the best type for the entire sample S is. To this end, block 216 correlates T(s, d) for all s in S. There are several ways to accomplish this—what follows is an exemplary list and is not meant to be exhaustive or limiting in any way. If T(s, d) is treated as a plain set, one can select the type t that appears most frequently across the members s of S and use t as the type for S. Applying this to the elements of Table 1, consider the types for the PROD element as being an unstructured set. In such a case, PROD might be labeled with the most common type—in this case Movie. Although this has the advantage of simplicity, it does not account for, e.g., TV programs which also form a part of the PROD element's instances. Alternatively, by taking advantage of the structure of each T(s, d), one can compute a structure representing the union of all T(s, d) and find a type that is most representative of the union. This may be accomplished, e.g., by finding the super-type of the union, the most "specific" type of the union, or some form of centroid type. In the example of FIG. 3 above, the "Visual media" type 306 would be the most representative type for the pool of instances shown by the "PROD" column in Table 1. "Visual media" 306 includes both the movies 302 and TV programs 304, but does not include "Audio media" 308, which does not occur in the example shown in Table 1. Another alternative would be to assign to S a set of types associated with a weight or probability, thereby computing T(S, d) from each T(s, d). Additionally, these techniques may be combined by, e.g., creating a hierarchy using only those types which are provided by a threshold number of sources. Furthermore, other approaches to selecting a best annotation may be used that fall within the present principles.

Once block 216 has determined a type (or types) for S, block 218 assigns the type(s) to a corresponding schema element E (or set of schema elements if they were collapsed in block 207). Block 218 correlates all the types of an element E across the sources, correlating all of the T(E, d) to find type(s) T(E) for all E across all sources.

Figure 4:
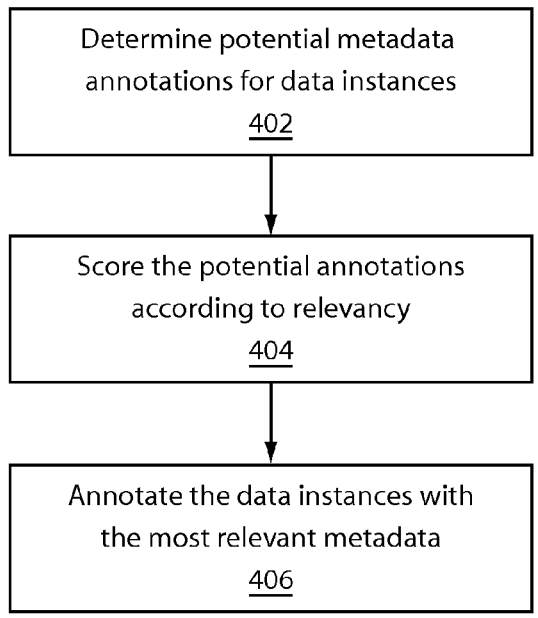
FIG. 4 is a block/flow diagram that depicts an exemplary method/system for automatically annotating schema attributes.

Referring now to FIG. 4, an exemplary method for automatic metadata annotation across heterogeneous sources is shown. In particular, FIG. 4 considers how to determine which type or types are "best" as described above in block 216. Block 402 accesses multiple heterogeneous sources to determine potential metadata annotations for input data instances. Block 404 then scores those annotations according to a measure of relevancy. Assigning values to types is inherently imprecise. Many of the external sources 106 that may be used according to the present principles not only return query results, but also provide scores associated with each of the results. Such scores may be considered as confidence values for the association between the query and the type. Different sources have different ways to assign scores that are opaque to the external observer, but the scores can nevertheless be used to determine the relevancy of a value.

For example, block 404 may include a threshold to filter out types below a certain score. Block 404 may also use internal knowledge (e.g., from internal sources 104) to assign scores to types. Furthermore, scores from multiple heterogeneous sources may be combined using a scoring function. One exemplary function includes, for example, sorting the returned types by score and pruning the types after a significant drop in score. For example, consider a query that returns the following scores: T1-100, T2-98, T3-92, T4-90, T5-45, T6-32. In this example, only types T1-T4 are kept, as the jump from T4 to T5 is large. Such an approach may be useful because score functions are often black boxes, and there is no way to determine whether a score like "100" is large without knowing the context. Another exemplary function gives larger weights to types that are returned by multiple sources. This approach does not rely on the scores provided by the sources at all, instead capitalizing on the heterogeneity of the sources. Thus, the more sources there are that suggest a given type, the more likely that type is to be relevant to the instance. Block 406 then takes the most relevant of the potential metadata and applies them to the input data instances.

Having described preferred embodiments of a system and method for annotating schema elements based on associating data instances with knowledge base entities (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for determining schema element types, comprising:
   pooling potential annotations, for an element of an unlabeled schema, from a plurality of heterogeneous sources, and merging instances of similar schema elements, wherein each of the plurality of heterogeneous sources provides a respective preliminary score for potential annotations and wherein the preliminary scores are formed by at least two different score assignation schemes;
   scoring, with a processor, the pool of potential annotations according to relevancy using instance information from the plurality of heterogeneous sources and a scoring function, which sorts potential annotations from each of the plurality of heterogeneous sources by score and prunes potential annotations after a drop in score between two of the sorted plurality of heterogeneous sources that is greater than a threshold, to combine multiple preliminary scores from the remaining heterogeneous sources into a relevancy score, wherein the scoring function gives larger weights to potential annotations that are returned by multiple sources from the plurality of heterogeneous sources; and
   annotating the element of the unlabeled schema using the most relevant potential annotations based on the relevancy score.

2. The method of claim 1, wherein scoring is performed using signatures of data instances.

3. The method of claim 2, wherein signatures are computed by using at least one of a group of methods consisting of tokenization of data instances using stop-words and n-grams.

4. The method of claim 1, wherein the pool of potential annotations is represented by a hierarchical structure, such that annotations sharing a super-type are merged into the super-type.

5. The method of claim 4, wherein hierarchical structures from the plurality of heterogeneous sources are combined into a single hierarchy to correlate all of the potential annotations across all of the plurality of heterogeneous sources.

6. The method of claim 1, wherein scoring includes assigning a weight to each of the plurality of heterogeneous sources, such that weighted scores for each type are combined from the plurality of heterogeneous sources to produce the relevancy score.

7. The method of claim 1, wherein scoring includes counting the number of the plurality of heterogeneous sources that provides each type to produce the relevancy score.

8. The method of claim 1, wherein scoring includes using structural properties of the potential annotations to produce the relevancy score.

9. The method of claim 8, wherein potential annotations that are further away in a hierarchical structure from a potential annotation that is being scored are assigned smaller scores than types that are closer in the hierarchical structure to the potential annotation being scored.

10. A method for determining schema element types, comprising:
  pooling potential annotations in a hierarchical structure, for an element of an unlabeled schema, from a plurality of heterogeneous sources, and merging instances of similar schema elements, wherein the hierarchical structures from the plurality of heterogeneous sources are combined into a single hierarchy to correlate all of the potential annotations for the element and wherein each of the plurality of heterogeneous sources provides a respective preliminary score for potential annotations and wherein the preliminary scores are formed by at least two different score assignment schemes;
  scoring with a processor the pool of potential annotations according to structural properties of the potential annotations, such that potential annotations that are further away in the hierarchical structure from a potential annotation that is being scored are assigned smaller scores than schema element types that are closer in the hierarchical structure to the potential annotation being scored, and using a scoring function, which sorts potential annotations from each of the plurality of heterogeneous sources by score and prunes potential annotations after a drop in score between two of the sorted plurality of heterogeneous sources that is greater than a threshold, to combine multiple preliminary scores from the remaining heterogeneous sources to produce a relevancy score, wherein the scoring function gives larger weights to potential annotations that are returned by multiple sources from the plurality of heterogeneous sources; and
  annotating the element of the unlabeled schema using the most relevant potential annotations based on the relevance score.

11. A system for determining schema element types, comprising:
  a query module configured to pool potential annotations, for an element of an unlabeled schema, from a plurality of heterogeneous sources, wherein each of the plurality of heterogeneous sources provides a respective preliminary score for potential annotations and wherein the preliminary scores are formed by at least two different score assignation schemes;
  a data module comprising a processor configured to merge instances of similar schema elements and to score the pool of potential annotations according to relevancy using instance information from the plurality of heterogeneous sources and a scoring function, which sorts potential annotations from each of the plurality of heterogeneous sources by score and prunes potential annotations after a drop in score between two of the sorted plurality of heterogeneous sources that is greater than a threshold, to combine multiple preliminary scores from the remaining heterogeneous sources into a relevancy score, wherein the scoring function gives larger weights to potential annotations that are returned by multiple sources from the plurality of heterogeneous sources; and
  a data linker configured to annotate the element of the unlabeled schema using the most relevant potential annotations based on the relevancy score.

12. The system of claim 11, wherein the data processor is configured to score potential annotations using signatures of data instances.

13. The system of claim 12, wherein signatures are computed by using at least one of the group of methods consisting of tokenization of data instances using stop-words and n-grams.

14. The system of claim 11, wherein the pool of potential annotations is represented by a hierarchical structure, such that annotations sharing a super-type are merged into the super-type.

15. The method of claim 14, wherein hierarchical structures from the plurality of heterogeneous sources are combined into a single hierarchy to correlate all of the potential annotations across all of the plurality of heterogeneous sources.

16. The system of claim 11, wherein the data processor is further configured to assign a weight to each of the plurality of heterogeneous sources, such that weighted scores for each type are combined from the plurality of heterogeneous sources to produce the relevancy score.

17. The system of claim 11, wherein the data processor is further configured to count the number of the plurality of heterogeneous sources that provides each type to produce the relevancy score.

18. The system of claim 11, wherein the data processor is further configured to use structural properties of the potential annotations to produce the relevancy score.

19. The system of claim 18, wherein potential annotations that are further away in a hierarchical structure from a potential annotation that is being scored are assigned smaller scores than types that are closer in the hierarchical structure to the potential annotation being scored.

20. A system for determining schema element types, comprising:
  a query module configured to pool potential annotations in a hierarchical structure, for an element of an unlabeled schema, from a plurality of heterogeneous sources, wherein the hierarchical structures from the plurality of sources are combined into a single hierarchy to correlate all of the potential annotations for the element and wherein each of the plurality of heterogeneous sources provides a respective preliminary score for potential annotations and wherein the preliminary scores are formed by at least two different score assignation schemes;

a data module comprising a processor configured merge instances of similar schema elements and to score the pool of potential annotations according to structural properties of the potential annotations, such that potential annotations that are further away in the hierarchical structure from a potential annotation that is being scored are assigned smaller scores than schema element types that are closer in the hierarchical structure to the potential annotation being scored, and using a scoring function, which sorts potential annotations from each source of the plurality of heterogeneous sources by score and prunes potential annotations after a drop in score between two of the sorted plurality of heterogeneous sources that is greater than a threshold, to combine multiple preliminary scores from the remaining heterogeneous sources to produce a relevancy score, wherein the scoring function gives larger weights to potential annotations that are returned by multiple sources from the plurality of heterogeneous sources; and a data linker configured to annotate the element of the unlabeled schema using the most relevant potential annotations based on the relevancy score.

21. A non-transitory computer readable storage medium comprising a computer readable program, wherein the computer readable program when executed on a computer causes the computer to:

pool potential annotations, for an element of an unlabeled schema, from a plurality of heterogeneous sources, and merge instances of similar schema elements, wherein each of the plurality of heterogeneous sources provides a respective preliminary score for potential annotations and wherein the preliminary scores are formed by at least two different score assignation schemes;

score the pool of potential annotations according to relevancy with a processor using information using instance information from the plurality of heterogeneous sources and a scoring function, which sorts potential annotations from each of the plurality of heterogeneous sources by score and prunes potential annotations after a drop in score between two of the sorted plurality of heterogeneous sources that is greater than a threshold, to combine multiple preliminary scores from the remaining heterogeneous sources into a relevancy score, wherein the scoring function gives larger weights to potential annotations that are returned by multiple sources from the plurality of heterogeneous sources; and annotate the element of the unlabeled schema using the most relevant potential annotations based on the relevancy score.

* * * * *